(12) United States Patent
Ferri et al.

(10) Patent No.: US 12,533,860 B2
(45) Date of Patent: Jan. 27, 2026

(54) TWO-PART MOLD FOR VULCANIZING TIRES

(71) Applicant: COMPAGNIE GENERALE DES ETABLISSEMENTS MICHELIN, Clermont-Ferrand (FR)

(72) Inventors: Johan Ferri, Clermont-Ferrand (FR); Jerome Lepretre, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1054 days.

(21) Appl. No.: 17/619,163

(22) PCT Filed: Jun. 12, 2020

(86) PCT No.: PCT/FR2020/051004
§ 371 (c)(1),
(2) Date: Dec. 14, 2021

(87) PCT Pub. No.: WO2020/249911
PCT Pub. Date: Dec. 17, 2020

(65) Prior Publication Data
US 2022/0355559 A1 Nov. 10, 2022

(30) Foreign Application Priority Data
Jun. 14, 2019 (FR) ...................................... 1906357

(51) Int. Cl.
*B29D 30/06* (2006.01)
(52) U.S. Cl.
CPC .. *B29D 30/0606* (2013.01); *B29D 2030/0613* (2013.01); *B29D 2030/063* (2013.01)

(58) Field of Classification Search
CPC ............ B29D 30/0601; B29D 30/0606; B29D 2030/0607; B29D 2030/0609;
(Continued)

(56) References Cited

U.S. PATENT DOCUMENTS

| 6,193,492 B1 | 2/2001 | Lagnier et al. |
| 2002/0134202 A1* | 9/2002 | Domange .......... B29D 30/0606 76/101.1 |
| 2019/0054770 A1* | 2/2019 | Wilson ................ B60C 11/0311 |

FOREIGN PATENT DOCUMENTS

| EP | 0 873 851 A1 | 10/1998 |
| EP | 1 479 508 A1 | 11/2004 |
| JP | 08268011 A | * 10/1996 |

OTHER PUBLICATIONS

Matsumoto K, JP-08268011-A, machine translation. (Year: 1996).*
(Continued)

*Primary Examiner* — Sedef E Paquette
(74) *Attorney, Agent, or Firm* — VENABLE LLP

(57) ABSTRACT

A mold (20) for vulcanizing tires comprises an upper part (24) and a lower part (26), the upper part and the lower part being able to move axially between an open position and a closed position in which the lower part and the upper part meet along a joint line (31). A mold part (24, 26) has at least one sipe blade (50), all or some of the sipe blades extending substantially axially or helically on the radially internal surface (30) of the mold, all or some of the sipe blades being: contiguous at one of their ends with a protruding element (46) and contiguous at the other of their ends with a recessed element (44) or with the other part of the mold, and able to move relative to the tire in the wake of the protruding element (46), during opening of the mold.

13 Claims, 2 Drawing Sheets

(58) Field of Classification Search
CPC .... B29D 2030/0612; B29D 2030/0613; B29D 2030/0616; B29D 2030/063; B60C 11/03; B60C 2200/06; B60C 2200/065
USPC ........................................................ 425/28.1
See application file for complete search history.

(56) References Cited

OTHER PUBLICATIONS

Marhenke U, EP 1479508, updated machine translation. (Year: 2004).*
International Search Report dated Sep. 22, 2020, in corresponding PCT/FR2020/051004 (4 pages).

* cited by examiner

[Fig. 1]
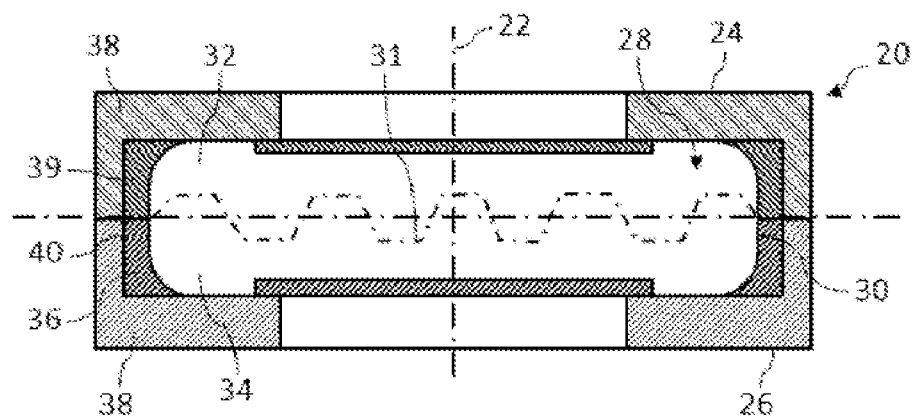
[Fig. 2]
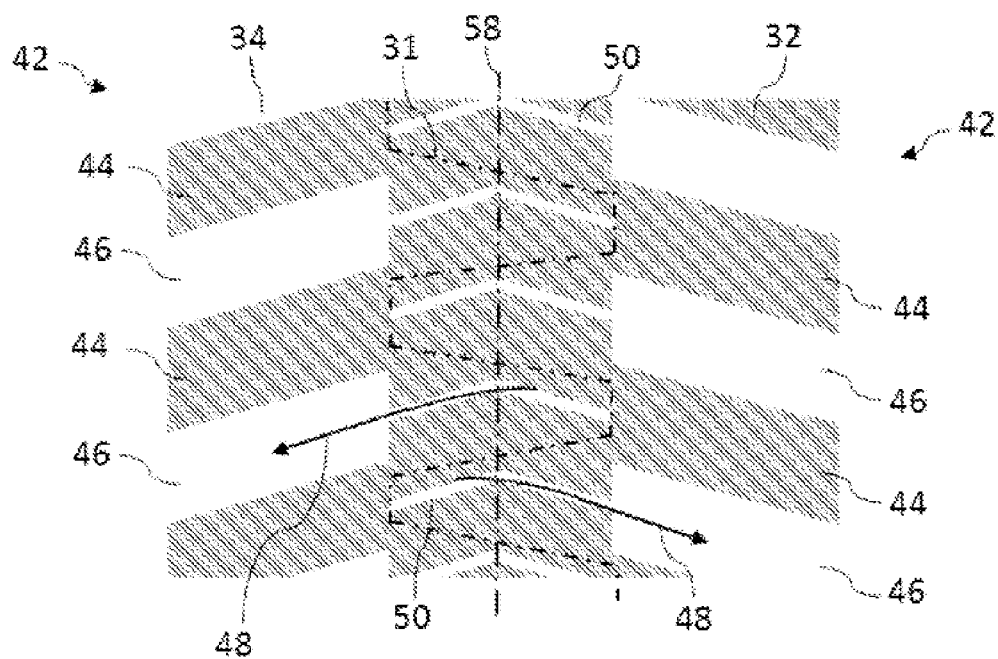

[Fig. 3]
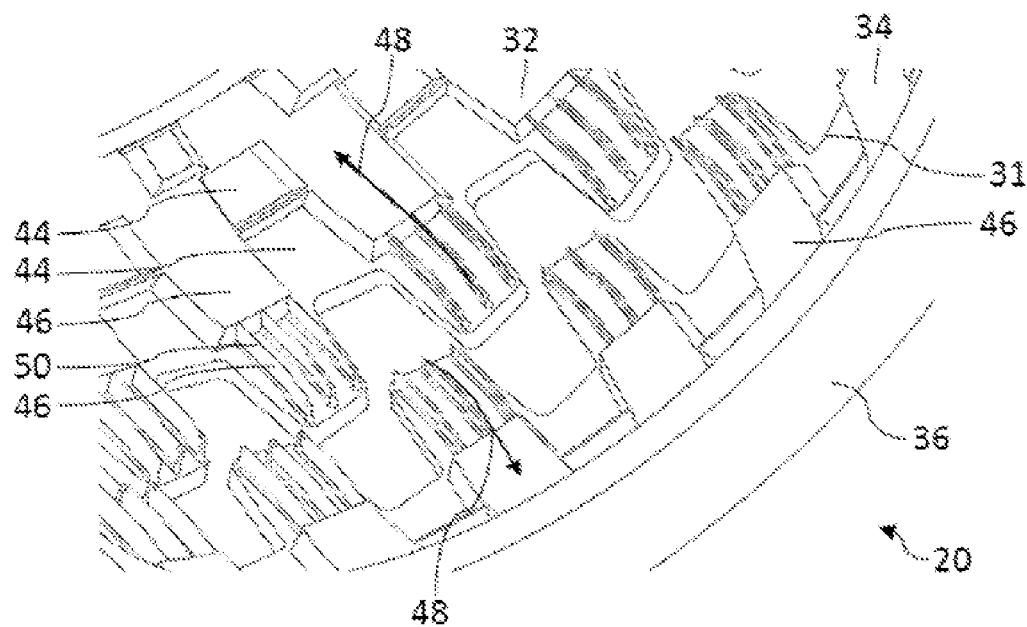
[Fig. 4]
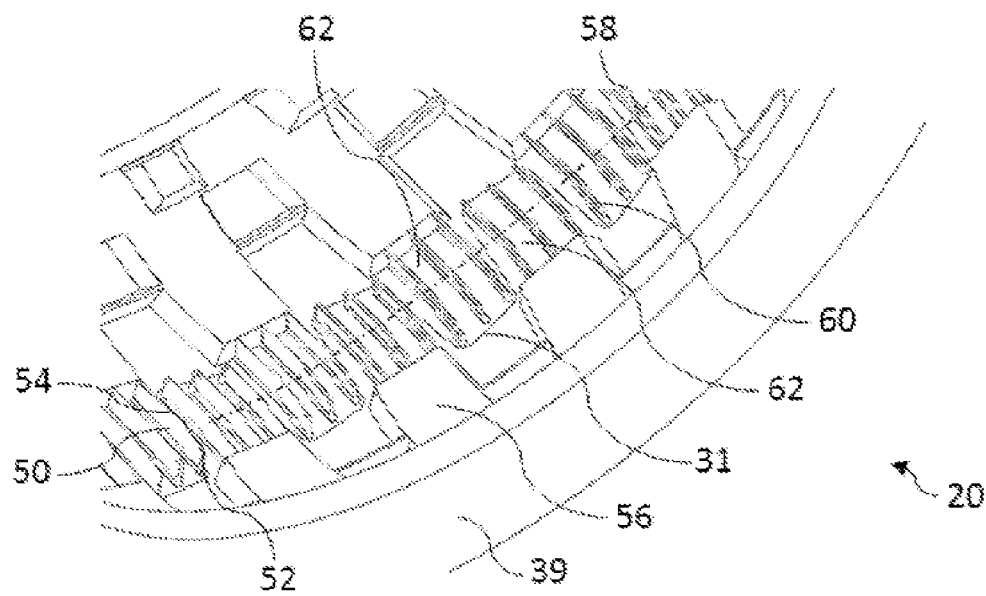

TWO-PART MOLD FOR VULCANIZING TIRES

BACKGROUND

The present invention relates to a two-part mould for vulcanizing tyres and, more particularly, for vulcanizing tyres of which the tread has transverse notches.

The manufacture of a tyre comprises a curing step, during which a green tyre is moulded and vulcanized so as to give the tyre its mechanical characteristics, its geometry and its final appearance.

The vulcanization of the tyre is carried out in a mould for vulcanizing tyres that comprises several parts. The various parts of the mould are able to move between an open position, in which they are remote from one another so as to allow the introduction or extraction of a tyre, and a closed position, in which they are in contact with one another, while at the same time forming an internal moulding surface intended to form the external surface of a tyre.

There is more particularly known a two-part mould comprising a central axis, an upper part and a lower part. Each part of the mould forms the external surface of one of the two sidewalls and of a part of the tread of the tyre (tread pattern). The lower part and the upper part are able to move axially between the open position and the closed position. In the closed position, the lower part and the upper part meet along a contour called the joint line. The joint line is generally inscribed in a median plane of the radially internal surface of the mould, and of substantially circular shape.

The two-part mould has the advantage of being of particularly simple construction.

However, the enclosure of the tyre, during closing of the mould, and its demoulding, during opening of the mould, cause deformation of the tread of the tyre, at the risk of causing the rubber making up the tread to creep, or of displacing the reinforcing plies used in the composition of the internal structure of the tyre.

Tyre developments incorporate design practices aimed in particular at providing a tyre tread pattern suitable for demoulding on a two-part mould. For example, patterns having undercuts are authorized on the tread pattern, provided that their demoulding does not cause elastic deformation of the tyre that damages its internal structure; the relative movements between the two parts of the mould and the tyre follow paths that are substantially axial or helical, and symmetrical with respect to the median plane of the tyre; the crown of the tyre has a radially domed profile.

These design practices have the consequence of greatly limiting the variety and disposition of the patterns forming the tread pattern of a tyre.

From application EP1479508, a two-part mould for vulcanizing tyres is known that has a joint line deviating from the median plane of the radially internal surface of the mould. Adapting the joint line makes it possible to envisage the axial demoulding of patterns extending beyond said plane.

However, adapting the joint line does not make it possible to widen the variety of the patterns forming the tread pattern of a tyre.

Furthermore, two-part moulds are particularly suitable for vulcanizing tyres that have simple patterns, such as tyres of agricultural type.

Since recent developments in agricultural tyres now aim to incorporate notches extending transversely in the centre of the tread, it is an objective of the invention to propose a two-part mould allowing said tyres to be demoulded.

SUMMARY

This objective is achieved by the invention, which proposes a mould for vulcanizing tyres, comprising a central axis, an upper part and a lower part. The mould has a radially internal moulding surface intended to form the external surface of all or part of the tread of the tyre. The upper part and the lower part are able to move axially between an open position and a closed position in which the lower part and the upper part meet along a joint line that divides the radially internal surface into two parts. At least one of the two parts of the radially internal surface has at least one pattern comprising at least one recessed element and one protruding element. The mould is characterized in that at least one mould part has at least one sipe blade and, preferably, each mould part has a plurality of sipe blades, all or some of said sipe blades extending substantially axially or helically on the radially internal surface of the mould, all or some of said sipe blades being:

contiguous at one of their ends with the protruding element and contiguous at the other of their ends with the recessed element or with the other part of the mould, able to move relative to the tyre in the wake of the protruding element, during opening of the mould.

A sipe blade is intended to form a notch on the external surface of the tread of the tyre. The notch thus formed on the tread pattern of the tyre extends transversely.

The absence of a recessed element between a sipe blade and the protruding element makes it possible to prevent a sipe blade from sectioning the rubber of the tread of the tyre. This makes the demoulding of the tyre easier. In addition, excessive deformation of the tread of the tyre, during demoulding, is thus avoided. Finally, the sipe blades are less highly stressed, and the frequency of interventions necessary for their repair is reduced.

The protruding element with which one of the ends of said sipe blade is contiguous follows a given demoulding path. Said sipe blade is able to move relative to the tyre following a protruding element. Said sipe blade is disposed in such a way that it is demoulded into the volume freed up by said protruding element during its demoulding.

Another subject of the invention is a method for vulcanizing a tyre using a mould for vulcanizing a tyre according to the invention.

Finally, one subject of the invention is a tyre obtained by a method for vulcanizing a tyre according to the invention.

BRIEF DESCRIPTION OF THE FIGURES

The invention will be better understood from the remainder of the description, which is based on the following figures:

FIG. 1 is a simplified view in radial section of a two-part mould according to the invention;

FIG. 2 is a simplified view of certain elements of the mould in FIG. 1;

FIG. 3 is a perspective view of a part of the mould in FIG. 1 in an intermediate position between an open position and a closed position of the mould;

FIG. 4 is a perspective view of a part of the mould in FIG. 1 in a closed position.

DETAILED DESCRIPTION

FIG. 1 illustrates, in a simplified manner, a two-part mould 20 for vulcanizing tyres, in a closed position.

Throughout the rest of the text, and unless otherwise indicated, an axial direction denotes a direction parallel to a central axis 22 of the mould, an axial plane denotes a plane perpendicular to the central axis of the mould, a transverse direction denotes a direction parallel to an axis of rotation of the cured tyre in said mould, a radial direction denotes a direction perpendicular to the central axis, a radial plane denotes a plane containing the central axis and a radial direction, and a circumferential direction denotes a direction perpendicular to a radial direction and to an axial direction.

A two-part mould 20 comprises the central axis 22, an upper part 24 and a lower part 26. The lower part and the upper part are able to move axially between an open position, in which they are remote from one another so as to allow the introduction or extraction of a tyre, and a closed position, in which they are in contact with one another, so as to form an internal moulding surface 28 intended to form the external surface of a tyre. The internal surface of the mould comprises a radially internal surface 30 forming the external surface of all or part of the tread of the tyre (tread pattern). In the closed position, the upper part 24 and the lower part 26 meet along a contour called the joint line 31, which divides the radially internal surface 30 into two parts 32, 34.

Each part of the mould 24, 26 comprises a lining 36 forming one of the two parts 32, 34 of the radially internal surface 30, and a shell 38 bearing the lining and other moulding elements intended to form the remainder of the internal moulding surface. The lining comprises a plurality of lining elements 39 disposed circumferentially so as to form a ring. A lining element rests, via a radially external surface, in a groove 40 in the shell.

FIG. 2 illustrates, partially and in a simplified manner, the radially internal surface 30 of the mould 20 according to the invention.

At least one of the two parts 32, 34 of the radially internal surface 30 has at least one pattern 42 comprising at least one recessed element 44 and one protruding element 46. By way of example, the two parts of the radially internal surface have a plurality of patterns. A pattern may have one recessed element and one protruding element, or a plurality of recessed elements and a plurality of protruding elements.

A "recessed element" is understood to mean a recessed form, which is generally solid, situated on the radially internal surface of a mould, which, optionally, delimits, encompasses or is contiguous with a protruding element 46. By way of example, a recessed element 44 takes the form of a parallelepipedal cavity or of a furrow extending circumferentially and/or axially.

A "protruding element" is understood to mean a protruding form, which is generally solid, situated on the radially internal surface of a mould, which, optionally, delimits, encompasses or is contiguous with a recessed element 44. By way of example, a protruding element 46 takes the form of a parallelepipedal projection, a bar or a blade extending circumferentially and/or axially.

The shape and disposition of a recessed element 44 or of a protruding element 46 are suitable for demoulding on a two-part mould 20. Thus, a pattern 42 is designed in such a way that, during opening of the mould, the relative movement between the mould at the location of the pattern and the tyre follows a given path, called the demoulding path 48.

Each pattern 42 follows a substantially identical demoulding path 48, and each pattern may be repeated circumferentially on the radially internal surface 30, such that the relative movement between the mould and the tyre is substantially uniform. By way of example, each part of the mould has a pattern that is repeated circumferentially.

The demoulding paths 48 of the two parts 24, 26 of the mould relative to the tyre are symmetrical with respect to an axial plane of the mould, said axial plane preferably being coplanar with the median plane 58 of the mould.

The demoulding paths 48 of the two parts 24, 26 of the mould relative to the tyre follow substantially axial or helical paths.

FIG. 3 and FIG. 4 illustrate a two-part mould 20 according to a preferred embodiment of the invention, respectively in a partially open position, and in a closed position.

According to the invention, at least a part 24, 26 of the mould has at least one sipe blade 50. Preferably, each part of the mould has a plurality of sipe blades.

A sipe blade 50 takes the form of a protruding element 46, which is long and thin, extending from the radially internal surface of the mould, preferably following a substantially radial profile 52.

"Thin element" is understood to mean that the thickness of a sipe blade 50 is less than or equal to 50% of its depth, and at most equal to 15 mm. Preferably, the thickness of the sipe blade is less than or equal to 25% of its depth, and at most equal to 5 mm. The depth of the sipe blade is in a range from 8 to 100 mm.

"Long element" is understood to mean that a sipe blade 50 extends along a longitudinal profile 54 extending over the radially internal surface 30 of the mould.

By way of example, the radial profile 52 or the longitudinal profile 54 of a sipe blade 50 can be rectilinear, domed, wavy, and can comprise deflections or breaks.

A sipe blade 50 can be made of a metallic material by any suitable method. By way of example, the sipe blade is produced by a method of consolidation by selective melting, or by a machining method.

A sipe blade 50 is intended to form a notch on the external surface of the tread of the tyre.

A sipe blade 50 is mounted with the body 56 of a lining element 39. By way of example, the sipe blade can be assembled with the body by any suitable assembly means and, preferably, by nesting the body of the lining element around the base of the insert, during a process of moulding a lining element. In an alternative embodiment of a lining element 39, the sipe blade 50 and the body 56 of the lining element are obtained in one piece during a machining process.

All or some of the sipe blades 50 extend substantially axially or helically on the radially internal surface of the mould. Such a disposition of the sipe blades makes their demoulding easier. The notch thus formed on the tread pattern of the tyre extends transversely.

"An element extending substantially in a given direction" is understood to mean that said element has a median profile in the given direction, the profile of said element deviating from the median profile by a distance at most equal to 50% of the length of said element.

All or some of said sipe blades 50 are contiguous at one of their ends with a protruding element, and contiguous at the other of their ends with a recessed element or with the other part of the mould.

The absence of a recessed element 44 between a sipe blade 50 and the protruding element 46 makes it possible to prevent a sipe blade from sectioning the rubber of the tread of the tyre during opening of the mould. This makes the demoulding of the tyre easier. In addition, excessive deformation of the tread of the tyre, during demoulding, is thus avoided. Finally, the sipe blades are less highly stressed, and the frequency of interventions necessary for their repair is reduced.

All or some of said sipe blades 50 are able to move relative to the tyre in the wake of the protruding element 46.

In other words, the protruding element 46 with which one of the ends of said sipe blade 50 is contiguous follows a given demoulding path 48. Said sipe blade is able to move relative to the tyre following a protruding element 46 during opening of the mould. Said sipe blade is disposed in such a way that it is demoulded into the volume freed up by said protruding element during its demoulding.

Preferably, the depth of the sipe blade 50 is less than or equal to the depth of the protruding element 46.

All or some of said sipe blades 50 are substantially centred with respect to the median plane 58 of the radially internal surface 30 of the mould, and extend axially over a length in a range from 0 to 70% of the width of said surface and, preferably, from 0 to 35% of the width of said surface.

"Substantially centred" is understood to mean that a sipe blade 50 extends axially in a zone of the radially internal surface 30 of the mould that is centred with respect to said median plane 58.

All or some of said sipe blades 50 have a stiffener 60 that takes the form of a bulge extending along the free contour of the sipe blade. The stiffener makes it possible to avoid deformation of said sipe blade, while at the same time allowing the integration of undercuts on said sipe blade, provided that its demoulding causes elastic deformation of the tread pattern of the tyre that does not damage its internal structure.

The thickness of the bulge 60 is less than or equal to 300% of the thickness of a sipe blade 50, and at most equal to 15 mm and, preferably, less than or equal to 200% of the thickness of a sipe blade and at most equal to 10 mm.

All or some of said sipe blades 50 are spaced apart by a distance at least equal to 150% of the thickness of the bulge and, preferably, to 200% of the thickness of the bulge and, more preferentially, to 250% of the thickness of the bulge and, even more preferably, to 300% of the thickness of the bulge. The spacing between the sipe blades makes it possible to prevent the pinching of the rubber of the tread pattern between two notches by said sipe blades and more particularly by their stiffeners.

The inventors have demonstrated that the demoulding of the sipe blades 50 is made easier when all or some of said sipe blades form with the demoulding path 48 of the tyre an angle at most equal to 45° and, preferably, at most equal to 30° and, even more preferably, at most equal to 15°. Likewise, demoulding is made easier when all or some of said sipe blades deviate from said direction by at most six times the thickness of a sipe blade and, preferably, by three times the thickness of a sipe blade.

In a position in which the mould is closed, all or some of the sipe blades 50 of one part of the mould are inserted between all or some of the sipe blades of the other part of the mould, such that the joint line 31 forms corrugations 62 on the radially internal surface 30 of the mould.

Thus, it is possible to dispose sipe blades 50 on either side of the median plane 58 of the radially internal surface 30 of the mould. Furthermore, the end of an inserted sipe blade, or a sipe blade extending beyond said median plane, may be contiguous with a recessed element 44, unlike a two-part mould of which the sipe blades are not inserted, or of which the joint line 31 is contained in said median plane. Thus, the variety of possible patterns is widened.

The insertion of the sipe blades 50 extends axially over a length from 0 to 70% of the width of the radially internal surface of the mould and, preferably, from 0 to 35% of the width of said surface. By way of example, the length of the inserted sipe blades may be less than the length of the zone of insertion of said sipe blades.

Each corrugation 62 groups together between one and ten sipe blades 50 and, preferably, between two and five sipe blades. The number of sipe blades may differ from one corrugation to another. By way of example, each corrugation has three sipe blades. A number of sipe blades that is identical from one corrugation to another makes it possible to better distribute the demoulding forces between each mould part. A large number of sipe blades in each corrugation makes it easier to manufacture the mould.

The free ends of two adjacent sipe blades 50, grouped together in a single corrugation 62, are axially spaced apart by a distance at least equal to 30% of the thickness of the bulge and, preferably, to 60% of the thickness of the bulge. The offset thus created makes it possible to avoid the pinching of the rubber situated between two notches during the demoulding of the sipe blades.

The inserted sipe blades take the form of a chevron with a deflection at most equal to 45° and, preferably, at most equal to 30° and, more preferentially, at most equal to 15°, such that the distance between the sipe blades is substantially constant in the circumferential direction of the radially internal surface of the mould. The sipe blade density in the circumferential direction can thus be increased.

Other variants and embodiments of the invention can be envisaged without departing from the scope of its claims.

The invention claimed is:

1. A mold for vulcanizing a tire,
the mold comprising a central axis and two parts, the two parts of the mold including an upper part and a lower part,
the mold having a radially internal molding surface intended to form an external surface of all or part of a tread of the tire,
the upper part and the lower part being able to move axially between an open position and a closed position in which the lower part and the upper part meet along a joint line that divides the radially internal molding surface into two parts,
at least one of the two parts of the radially internal molding surface having at least one pattern comprising at least one recessed element and at least one protruding element,
wherein each mold part has a plurality of sipe blades, all or some of the sipe blades extending substantially axially or helically on the radially internal molding surface of the mold,
wherein all or some of the sipe blades are contiguous at one of end thereof with the at least one protruding element and contiguous at another end thereof with the at least one recessed element or with the other of the at least one of the two parts of the mold,
wherein all or some of the sipe blades are able to move relative to the tire in a wake of the at least one protruding element, during opening of the mold,
wherein a depth of sipe blades of the all or some of the sipe blades that are contiguous at one end thereof with the at least one protruding element is less than or equal to a depth of the at least one protruding element, and
wherein all or some of the sipe blades deviate from a demolding direction of the tire by at most six times a thickness of a sipe blade.

2. The mold according to claim 1, wherein all or some of the sipe blades are substantially centered with respect to a median plane of the radially internal molding surface of the mold, and extend axially over a length in a range from 0 to 70% of a width of the radially internal molding surface.

3. The mold according to claim 1, wherein all or some of the sipe blades have a stiffener that takes a form of a bulge extending along a free contour of a sipe blade.

4. The mold according to claim 3, wherein a thickness of the bulge is less than or equal to 300% of a thickness of a sipe blade and at most equal to 15 mm.

5. The mold according to claim 4, wherein all or some of the sipe blades are spaced apart by a distance at least equal to 150% of the thickness of the bulge.

6. The mold according to claim 3, wherein ends of two adjacent sipe blades, grouped together in a single corrugation, are axially spaced apart by a distance at least equal to 200% of a thickness of the bulge.

7. The mold according to claim 1, wherein all or some of the sipe blades form, with a demolding direction of the tire, an angle at most equal to 30°.

8. The mold according to claim 1, wherein all or some of the sipe blades of one part of the mold are inserted between all or some of the sipe blades of the other part of the mold, in a position in which the mold is closed, such that the joint line forms corrugations on the radially internal molding surface of the mold.

9. The mold according to claim 8, wherein an insertion of the sipe blades extends axially over a length from 0 to 70% of a width of the radially internal molding surface of the mold.

10. The mold according to claim 9, wherein each corrugation groups together between one and ten sipe blades.

11. The mold according to claim 8, wherein sipe blades of the plurality of sipe blades take the form of a chevron with a deflection at most equal to 30° such that a distance between the sipe blades of the plurality of sipe blades is substantially constant in a circumferential direction of the radially internal molding surface of the mold.

12. A method for vulcanizing a tire using a mold for vulcanizing a tire according to claim 1.

13. A tire obtained by the method for vulcanizing a tire according to claim 12.

* * * * *